United States Patent
Ezrielev et al.

(10) Patent No.: US 12,488,257 B2
(45) Date of Patent: Dec. 2, 2025

(54) SYSTEM AND METHOD FOR REDUCTION OF DATA TRANSMISSION IN DYNAMIC SYSTEMS

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 896 days.

(21) Appl. No.: 17/726,182

(22) Filed: Apr. 21, 2022

(65) Prior Publication Data
US 2023/0342638 A1   Oct. 26, 2023

(51) Int. Cl.
*G06N 5/04* (2023.01)

(52) U.S. Cl.
CPC ..................... *G06N 5/04* (2013.01)

(58) Field of Classification Search
CPC ................ G06N 5/04; G06N 20/00
See application file for complete search history.

(56) References Cited

U.S. PATENT DOCUMENTS

| | | | |
|---|---|---|---|
| 11,961,598 B1 * | 4/2024 | Finley | G06F 16/283 |
| 2006/0167917 A1 * | 7/2006 | Solomon | G05B 19/418 |
| 2016/0026520 A1 | 1/2016 | Bouta et al. | |
| 2019/0044786 A1 | 2/2019 | Wouhaybi et al. | |
| 2021/0376853 A1 | 12/2021 | De et al. | |
| 2022/0197306 A1 * | 6/2022 | Cella | G06N 20/10 |

OTHER PUBLICATIONS

Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.

(Continued)

*Primary Examiner* — El Hadji M Sall
(74) *Attorney, Agent, or Firm* — WOMBLE BOND DICKINSON (US) LLP

(57) ABSTRACT

Methods and systems for managing data collection in a distributed system are disclosed. To manage data collection, the system may include a data aggregator and a data collector. The data aggregator and may utilize an inference model to predict data based on future measurements performed by data collectors throughout a distributed system without having access to the measurements. The data collectors may be mobile, and the data aggregator may direct the data collectors to various locations. To select paths for the data collectors to follow, the aggregator may utilize the level of uncertainty in predictions, the sensitivities in ranges of data to downstream consumers of the data collected by the data collectors, and/or other types of information. The data aggregator may select the paths for varying goals over time.

20 Claims, 13 Drawing Sheets

(56) References Cited

OTHER PUBLICATIONS

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting node similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs=python> on Apr. 27, 2022).

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssrn.com/sol3/papers.cfm?abstract_id=3529843.

Lewandowski et al., "Classifier-Based Data Transmission Reduction in Wearable Sensor Network for Human Activity Monitoring", Sensors 2021, 21, 85. <https://dx.doi.org/10.3390/s21010085>, Dec. 25, 2020, 22 pages (Year: 2020).

Cui et al., "Classification of data aggregation functions in wireless sensor networks", Computer Networks, vol. 178, 107342, <https://doi.org/10.1016/j.comnet.2020.107342>, 13 pages (Year: 2020).

Liazid et al., "An improved adaptive dual prediction scheme for reducing data transmission in wireless sensor networks", Wireless Networks, 25:3545-3555, <https://doi.org/10.1007/s11276-019-01950-7>, Feb. 2, 2019, 11 pages (Year: 2019).

Chen et al., "Online Model-Driven Data Acquisition for Wireless Sensor Networks", 2015 IEEE Wireless Communications and Networking Conference (WCNC). IEEE, 2015, 6 pages (Year: 2015).

Zhang et al., "Lightweight Self-Adapting Linear Prediction Algorithms for Wireless Sensor Networks", IEEE Sensors Journal, vol. 15, No. 5, May 2015, pp. 3050-3058 (Year: 2014).

Jain et al., "A Novel Data Prediction Technique Based on Correlation for Data Reduction in Sensor Networks", Proceedings of International Conference on Artificial Intelligence and Applications: ICAIA 2020. Springer Singapore, 2021, 12 pages (Year: 2020).

\* cited by examiner

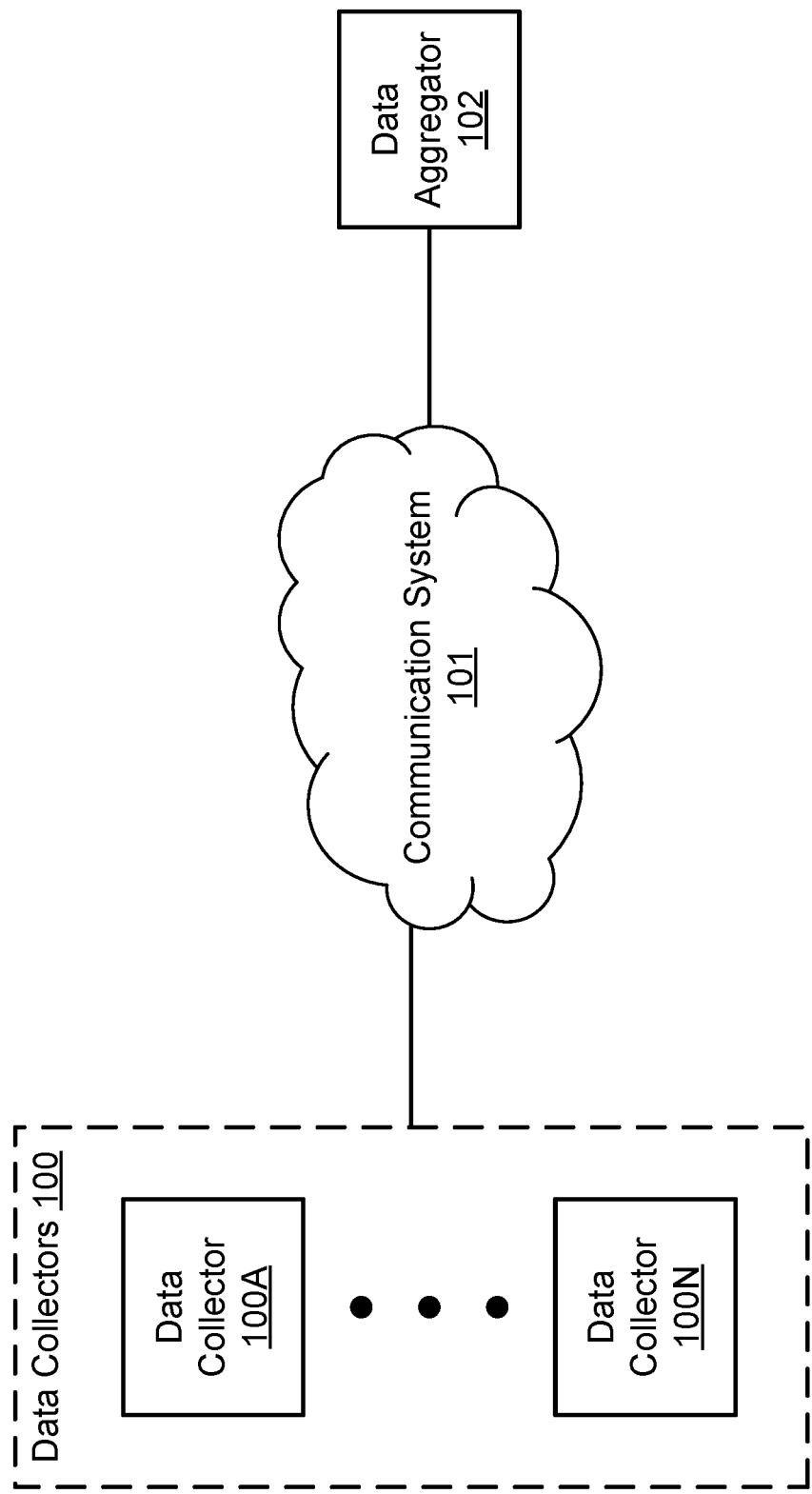

SYSTEM AND METHOD FOR REDUCTION OF DATA TRANSMISSION IN DYNAMIC SYSTEMS

FIELD

Embodiments disclosed herein relate generally to data collection. More particularly, embodiments disclosed herein relate to systems and methods to limit the transmission of data during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
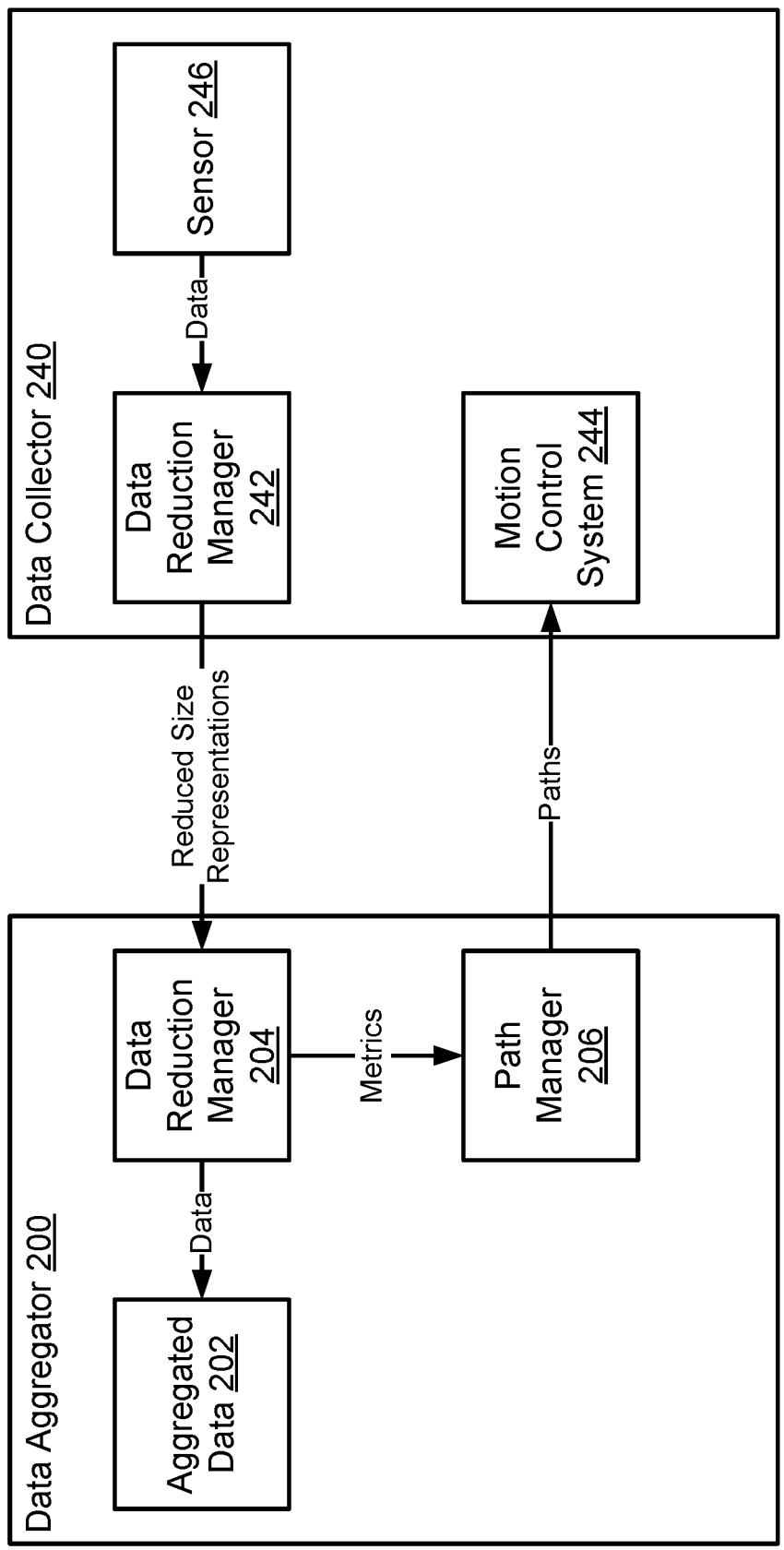
FIG. 2A shows a block diagram illustrating a data aggregator in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed system. To manage data collection, the system may include a data aggregator and a data collector. The data aggregator and may utilize an inference model to predict data based on future measurements performed by data collectors throughout a distributed system without having access to the measurements.

The data collectors may be mobile, and the data aggregator may direct the data collectors to various locations. To select paths for the data collectors to follow, the aggregator may utilize the level of uncertainty in predictions, the sensitivities in ranges of data to downstream consumers of the data collected by the data collectors, and/or other types of information.

The data aggregator may select the paths for varying goals over time. For example, during some periods of time, the data aggregator may select paths to better characterize environments in which data collectors may reside. In other periods of time, the data aggregators may select paths to reduce the need for communications between the data collectors and the data aggregators (e.g., while communication bandwidth is limited).

By doing so, embodiments disclosed herein may provide a distributed system that is able to respond to dynamically changing conditions in the system while limiting data transmission and power consumption for data aggregation purposes.

In an embodiment, a method for managing data collection in a distributed system where data is collected in a data aggregator of the distributed system and from a data collector of the distributed system that is operably connected to the data aggregator via a communication system is provided. The method may include identifying, by the data aggregator, a path selection event for the data collector; obtaining, by the data aggregator and in response to the path selection event, prediction uncertainty levels for multiple paths available to the data collector; selecting, by the data aggregator, a path of the multiple paths based on the prediction uncertainty levels for the multiple paths; directing, by the data aggregator, the data collector along the path; obtaining, by the data aggregator and using an inference model, predictions of data obtained by the data as the data collector traverses the path; obtaining, by the data aggregator, a portion of the data from the data collector as it traverses the path; aggregating, by the data aggregator, the portion of the data and a portion of the predictions to obtain validated data; and initiating, by the data aggregator and based on the validated data, performance of one or more actions to manage operation of the distributed system.

Obtaining the portion of the data may include obtaining, by the data aggregator and from the data collector, a reduced size representation of a sub-portion of the portion of the data; and reconstructing, by the data aggregator, the sub-portion of the portion of the data using the reduced size representation and a prediction of the predictions corresponding to the sub-portion of the portion of the data.

The reduced size representation may include a difference between a collector prediction that is identical to the prediction and the sub-portion of the portion of the data.

The reduced size representation may include a statistic derived from a plurality of the sub-portion of the portion of the data obtained by the data collector. The statistic may indicate whether one or more of the sub-portions of the portion are accurately generated by an inference model hosted by the data aggregator.

Obtaining the prediction uncertainty levels for the multiple paths may include for the path of the multiple paths: obtaining prediction uncertainties from the inference model for points along the path; and using, at least in part, the prediction uncertainties associated with the points to obtain a prediction uncertainty level of the prediction uncertainty levels for the path.

Selecting the path may include making a determination that the prediction uncertainty level is a highest prediction uncertainty level of the prediction uncertainty levels; and selecting the path of the multiple paths based on the determination.

Each of the multiple paths may be a possible path between a start location and a goal location for the data collector, and a duration of time for traversing each of the multiple paths is substantially similar.

Selecting the path may include making a determination that the prediction uncertainty level is a lowest prediction uncertainty level of the prediction uncertainty levels; and selecting the path of the multiple paths based on the determination.

The prediction uncertainties for the points may be used in a weighted average to obtain the prediction uncertainty level.

A path of the multiple paths may be selected additionally based on a sensitivity level of a consumer of the validated data. An objective function may take into account the sensitivity levels of the downstream consumers to ranges of the validated data, to large changes in the data (e.g., anomalies), and/or other factors such as energy consumption/distance/etc. regarding each of the paths.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services that may utilize data aggregated from various sources throughout a distributed system.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed system.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data. In an industrial environment, for example, data aggregator 102 may decide when to open and/or close valves using the aggregated data. Data aggregator 102 may be utilized in other types of environments and to make other types of control decisions without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different data collectors may provide similar and/or different data collection services.

To aggregate data from data collectors 100, some portion and/or representations of data collected by data collectors 100 may be transmitted across communication system 101 to data aggregator 102 (and/or other devices). The transmission of large quantities of data over communication system 101 may have undesirable effects on the communication system 101, data aggregator 102, and/or data collectors 100. For example, transmitting data across communication system 101 may consume network bandwidth and increase the energy consumption of data collectors 100. However, in some cases, it may be desirable to increase the volume of data transmissions in order to increase the accuracy of the aggregated data for consumption by downstream applications, to more fully characterize processes, and/or for other purposes. To manage the process of data aggregation for different purposes, data aggregator 102 and/or data collectors 100 may dynamically adapt the operation of the system of FIG. 1 in order to prioritize either data accuracy, data transmission reduction, energy consumption efficiency, and/or to meet other goals.

All or portion of data collectors 100 may be mobile. For example, any of data collectors 100 may move within an environment. The location and position of the data collector in the environment may impact the accuracy of an understanding of the environment obtained using the data collectors. For example, by moving to various locations within an environment, data collectors 100 may be able to more fully characterize their environments. Depending on the location within the environment, the variability of the environment may increase or decrease. Consequently, to fully characterize environment, more data regarding portions of the environment subject to high variability may be needed when compared to data regarding other portions of the environment subject to low variability that may be necessary to characterize the environment.

In general, embodiments disclosed herein may provide methods, systems, and/or devices for managing data collection in a distributed system. To manage data collection in a distributed system, a system in accordance with an embodiment may limit the transmission of data between components of the system while ensuring that all components that need access to the data to provide their respective functions are likely to have access to accurate data (e.g., such as the data based on measurements performed by data collectors 100). By limiting the transmission of data, communication bandwidth of the system of FIG. 1 may be preserved, energy consumption for data transmission may be reduced, etc.

To limit the transmission of data, data collectors 100 may transmit portions and/or representations of data if the portions rather than all of the data obtained by data collectors 100. Data collectors 100 may attempt to predict data that may be obtained by data collectors 100 thereby reducing the need for data collected by the data collectors 100 to be transmitted to data aggregator 102 (e.g., the predictions may be used rather than obtained data). The representations may be implemented as statistics (e.g., statistical information regarding a portion of data obtained by a data collector), as differences (e.g., between data obtained by a data collector and a prediction for the collected data which may be generated locally or remotely), and/or other representations. In the case of differences, twin prediction models at the aggregator and collector may facilitate reconstruction of the data (or approximate reconstruction, with some error) at the aggregator with transmission of the difference (e.g., which may be highly compressible and/or otherwise require less data to represent). Transmission of portions or representations of collected data may allow data aggregator 102 to provide its functionality (e.g., which may not require perfectly accurate data of that collected by data collectors 100).

To generate the predictions, data collectors 100 may train and use inference models. The inference models may be implemented with, for example, trained machine learning models. The trained machine learning models may not be perfectly accurate and may also provide indications regarding the likely accuracies (e.g., referred to as uncertainties) of the predictions that are generated using the inference models.

To manage the data collected by data collectors 100, data aggregator 102 identify where data collectors 100 should move within an environment to better characterize the environment. To determine where the data collectors 100 should move, data aggregator 102 may identify the uncertainties of predictions provided by the inference models for various areas within an environment. Higher levels of uncertainty in the predictions of the inference models for various areas within an environment may indicate that those areas have not been well characterized by the data collectors. Consequently, to better characterize the environments, the uncertainties of predictions for these areas may be used to determined movement paths for data collectors 100.

Figure 2B:
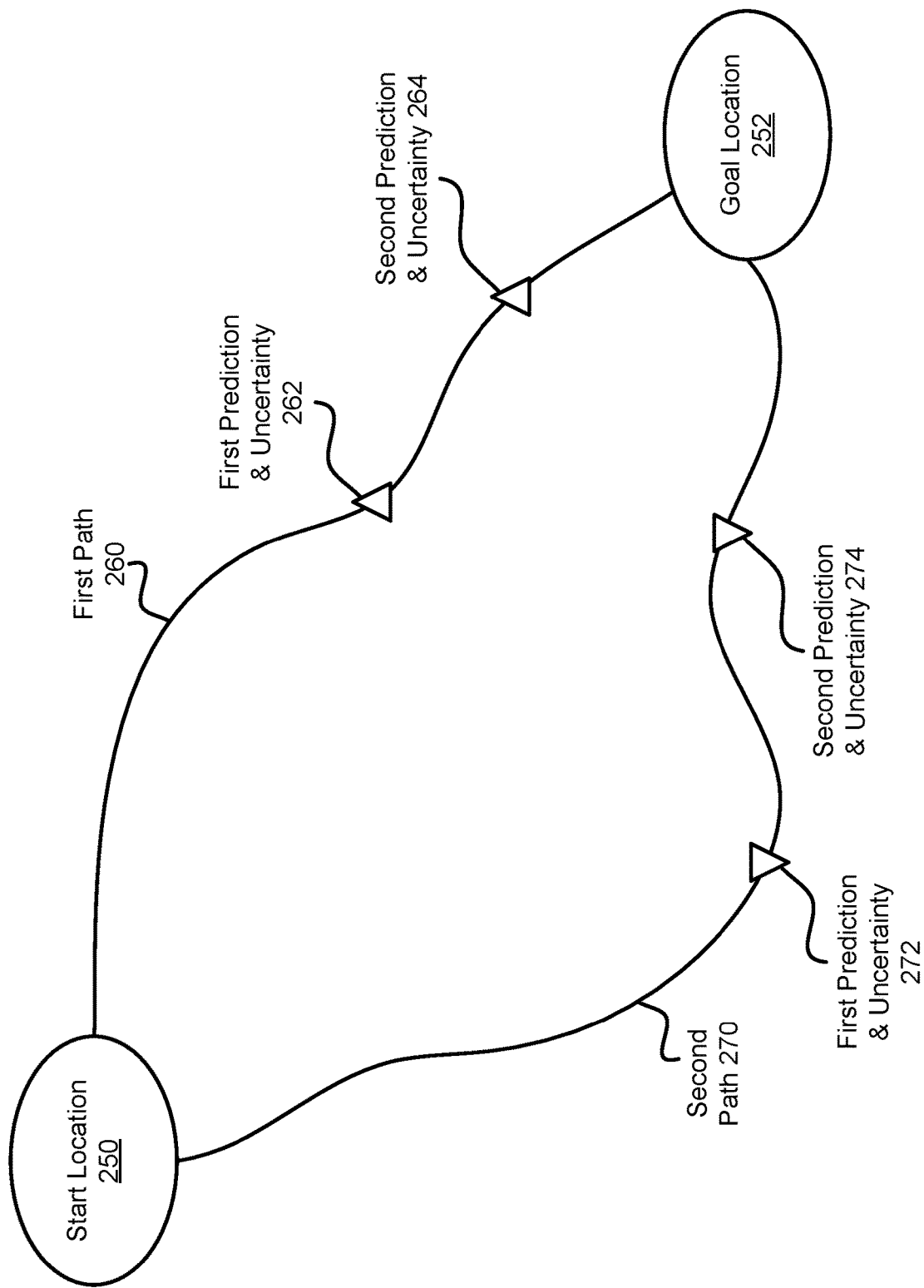
FIG. 2B shows a diagram illustrating path selection in accordance with an embodiment.

To manage the movement of data collectors 100, data aggregator 102 may identify the relative uncertainty levels of various paths (e.g., that may otherwise be equal or substantially equal such as within 10% in length, quantity of energy required for traversal, and/or other characteristics for traversing each path) between a start location within an environment and a goal location within an environment. For example, the data aggregator 102 may, for a given path, use an inference model to provide the uncertainties for points along the path. The uncertainties for the points along the path may then be analyzed to identify an uncertainty level for the path. The analysis may be a statistic analysis such as an average, a weighted, average, etc. The data aggregator 102 may compare the uncertainty levels of each of the possible paths to identify a path (e.g., the path associated with the highest uncertainty level, or lowest uncertainty level depending on the goal) for the data collector to traverse. Once identified, data aggregator 102 may instruct the data collector to move along the path. Refer to FIGS. 2A-2B for additional details regarding path evaluation.

By selecting paths, as discussed above, data aggregator 102 may manage the movement of data collectors 100 in a manner that may (i) improve the information known about the environments in which data collectors 100 reside, (ii) selectively reduce communications (e.g., by directing data collectors 100 towards areas associated with high certainty levels in predictions of data that will be collected in those areas) in scenarios in which communication bandwidth of communication system 101 may be limited, and/or (iii) to meet other goals.

When performing its functionality, data aggregator 102 may perform all, or a portion, of the methods and/or actions shown in FIGS. 3A-5D.

To provide their respective functionalities, all or a portion of data collectors 100 may (i) obtain data based on a measurement of interest to data aggregators or other entity (e.g., the consumer), (ii) move along paths indicated by data aggregators, and/or (iii) transmit a portion and/or representation of the obtained data to data aggregator 102. When deciding whether to transmit data to data aggregator 102, data collectors 100 may take into account whether doing so may be helpful or may not be helpful. For example, data aggregator 102 may compare data (or information derived from the data) to thresholds, may monitor for data drift, and/or may perform other actions to ascertain whether transmitting collected data to data aggregator 102 may be beneficial. If not beneficial, then data collectors 100 may discard the collected data without transmitting it to data aggregator 102 (unless instructed to do so) thereby reducing communication bandwidth usage. By doing so, data from a distributed system may be aggregated for use in a manner that balances consumption of communication bandwidth and/or energy against the utility of the data by data aggregator 102.

For example, in a twin inference model scenario, a data aggregator may elect to discard collected data that is similar to that predicted by the inference models hosted by the data aggregator and corresponding data collector. The data aggregator may utilize the somewhat inaccurate prediction for downstream purposes rather than collecting the data obtained by the data aggregator. When making such determinations, the sensitivity of consumers of the data, drift in the obtained data, anomalies present in the obtained data, and/or other considerations may be taken into account.

When performing its functionality, data collectors 100 may perform all, or a portion, of the methods and/or actions shown in FIGS. 3A-5D.

Any of data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 6.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a diagram of data aggregator 200 and data collector 240 in accordance with an embodiment is shown. Data aggregator 200 may be similar to data aggregator 102, and data collector 240 may be similar to any of data collectors 100. In FIG. 2A, data aggregator 200 and data collector 240 are connected to each other via a communication system (not shown). Communications between data aggregator 200 and data collector 240 are illustrated using lines terminating in arrows.

As discussed above, data aggregator 200 may obtain aggregated data 202. Aggregated data 202 may include data obtained from data collector 240 and/or predictions of data collected by data collector 240 that is not obtained by data aggregator 200. Downstream consumers (e.g., applications) may utilize aggregated data 202 to provide any type and quantity of services.

To obtain aggregated data 202, data aggregator 200 may host a data reduction manager 204. Data collector 240 may host a complementary data reduction manager 242. These data reduction managers 204, 242 may facilitate data collection in a manner that reduces the quantity of data transmitted between data aggregator 200 and data collector 240. For example, data reduction manager 242 may (i) transmit reduced size representations of data collected by data collector 240 and/or (ii) selectively transmit data to data aggregator 200. Data reduction manager 242 may (i) used the reduced size representations to reconstruct (perfectly or imperfectly) the data collected by data collector 240 and (ii) use predictions of the data collected by data collector 240 when reduced size representations are not provided by data collector 240. Data reduction manager 204 may store the data (either reconstructed or predictions) as aggregated data 202. Aggregated data 202 may be treated by downstream consumers as though it matches the data collected by data collector 240, even though there may be some degree of difference.

To provide their functionalities, the data reductions manager 204, 242 may include or use trained inference models. The trained inference models may provide both inferences (predictions of data collected by data collector 240) and uncertainties with respect to the predictions. Data reduction manager 204 may utilize these predictions and uncertainties to provide metrics to path manager 206.

The metrics may be used by path manager 206 to select paths for data collector 240. A path may connect a start location to a goal location. For any start and goal locations, there may be any number of paths over which data collector 240 may traverse to reach the goal location from the start location. For any start and goal locations, path manager 206 may select one of the paths and instruct data collector 240 to follow the selected path.

Path manager 206 may, as part of the path selection process, take into account the metrics provided by data reduction manager 204. These metrics may include the uncertainties of the predictions of the data that data collector 240 would collect along the points of the paths under evaluation.

To select a path, path manager 206 may rank the paths using an objective function. The objective function may provide a numerical score for each of the paths. The objective function may take into account, for example, the length of each path, the quantity of energy consumed to traverse the respective path, the uncertainty of the predictions generated by data reduction manager 204 for data collected by data collector 240 along the paths, the value of conserving communication bandwidth while data collector 240 traverses each path, etc. The objective function may take other information into account without departing from embodiments disclosed herein.

In an embodiment, path manager 206 uses an objective function (e.g., an environmental evaluation optimized objective function) that weights (for all other considerations being equal) paths that are associated with higher levels of prediction uncertainty as having a better score than for other paths that are associated with lower levels of prediction uncertainty. Doing so may facilitate improved understanding of the environment in which data collector 240 is located.

In an embodiment, path manager 206 uses an objective function (e.g., a data reduction optimized objective function) that weights (for all other considerations being equal) paths that are associated with lower levels of prediction uncertainty as having a better score than for other paths that are associated with high levels of prediction uncertainty. Data reduction manager 204 be more likely to generate accurate predictions of data collected by data collector 240 as it traverses such paths, thereby reducing the quantity of data likely to be transmitted by data collector 240 to data aggregator 200 along the better scored paths.

In an embodiment, path manager 206 dynamically switches between use of different objective functions (e.g., optimized for different goals). For example, path manager 206 may monitor the communication conditions between data aggregator 200 and data collector 240, the power available to data aggregator 200 and/or data collector 240, and/or other conditions, and dynamically switch between the objective functions depending on the conditions.

The numerical score for each of the paths obtained by use of the objective function may be used to rank the paths with respect to one another. Data aggregator 200 may select the path based on the ranks of the paths and instruct data collector 240 to follow the selected path.

In an embodiment, path manager 206 (and/or other entities) store information regarding various paths in a data structure. The data structure may facilitate rapid evaluation of the utility of any number of potential paths. For example, the data structure may be a graph database or other type of data structure that may be used for path analysis.

The motion control system 244 of data collector 240 may receive information regarded the selected path. Motion control system 244 may move data collector 240 to follow the selected path. For example, motion control system 244 may be operably connected to motors or other devices of data collector 240 that may be operated to move data collector 240. Motion control system 244 may operate such devices in a manner that causes motion control system 244 to follow the selected path.

While traversing the path, data collector 240 may obtain data via one or more of sensor 246. Sensor 246 may obtain information regarding a characteristic of an environment in which data collector 240 is positioned. Sensor 246 may obtain the information using any sensing modality and may be implemented with any type of sensor. Different sensors of data collector 240 may collect similar or different types of information, and may collect any quantity of information. Sensor 246 may encode the information in data, and provide the data to data reduction manager 242. Sensor 246 may be implemented with any type of hardware device for sensing.

In an embodiment, any of data reduction manager 204, path manager 206, data reduction manager 242, and motion control system 244 is implemented using a hardware device including circuitry. The hardware device may be, for example, a digital signal processor, a field programmable gate array, or an application specific integrated circuit. The circuitry may be adapted to cause the hardware device to perform the functionality of data reduction manager 204, path manager 206, data reduction manager 242, and/or motion control system 244. Data reduction manager 204, path manager 206, data reduction manager 242, and/or motion control system 244 may be implemented using other types of hardware devices without departing embodiment disclosed herein.

In one embodiment, any of data reduction manager 204, path manager 206, data reduction manager 242, and motion control system 244 is implemented using a processor adapted to execute computing code stored on a persistent storage that when executed by the processor performs the functionality of data reduction manager 204, path manager 206, data reduction manager 242, and/or motion control system 244 discussed throughout this application. The processor may be a hardware processor including circuitry such as, for example, a central processing unit, a processing core, or a microcontroller. The processor may be other types of hardware devices for processing information without departing embodiment disclosed herein.

While illustrated in FIG. 2A with a limited number of specific components, a data aggregator and/or data collector may include additional, fewer, and/or different components without departing from embodiments disclosed herein.

As discussed above, a data aggregator may select a path for a data collector to travers. Turning to FIG. 2B, a diagram illustrating two paths 260, 270 in accordance with an embodiment is shown.

First path 260 and second path 270 may be two potential paths over which a data collector may traverse from start location 250 to goal location 252. To determine which of these paths to take, path manager may for each path, identify any number of points along the paths. In FIG. 2B, a few example points are illustrated with triangles positioned over the respective paths.

For each of these paths, the path manager may obtain metrics from data reduction manager 204. The metrics may include, for example, a first predictions & uncertainty 262 for a first point and a second prediction & uncertainty 264 for a second point along first path 260. Path manager 206 may use the uncertainty of the predictions and/or the predictions for any number of points along first path 260 to identify an uncertainty level for first path 260 and/or a relative level of interest for the path. For example, the uncertainty associated with the points may be averaged (or a weighted average or other statistic) may obtain the uncertainty level for first path 260. Likewise, the predictions for the points along the path may be graded with respect to whether the prediction represents unusual, risky, or otherwise interesting events. The grades for the predictions may be statistically analyzed to obtain an interest level for the path. A similar process may be performed (e.g., obtaining first prediction & uncertainty 272 and second predictions uncertainty 274 for points on second path 270) to identify an uncertainty level for second path 270. As will be discussed in greater detail below, the level of interest and/or uncertainty levels may be used to rank paths with respect to one another, for path selection purposes.

To obtain the predictions, various information may be taken, as input, to the trained machine learning model. For example, the locations of the points and the time when the data collector would be at the respective points in the future may be supplied to the trained machine learning model.

While not shown in FIG. 2B, various data collectors may already be instructed to follow various paths through the environment through which the data collector will traverse.

In some cases, the paths along which other data collectors will traverse in the future may be taken into account when identifying the uncertainty of each of the paths. For example, any portion of first path 260 or second path 270 that are close to other paths which other data collectors will traverse in the future may take into account in the uncertainty level of first path 260 and second path 270. To do so, rather than calculating an uncertainty level for the predictions associated with points of first path 260 and path 270 that are close to points along paths that other data collectors will traverse, the prediction uncertainty for the points of first path 260 and path 270 may be treated as having very low or no uncertainty (e.g., because a data collector with traverse close to these points in the future, thereby allowing for data to be collected for these points). Refer to FIGS. 5A-5D for additional information regarding uncertainty level identification for potential paths based on paths that other data collectors will traverse.

Figure 3A:
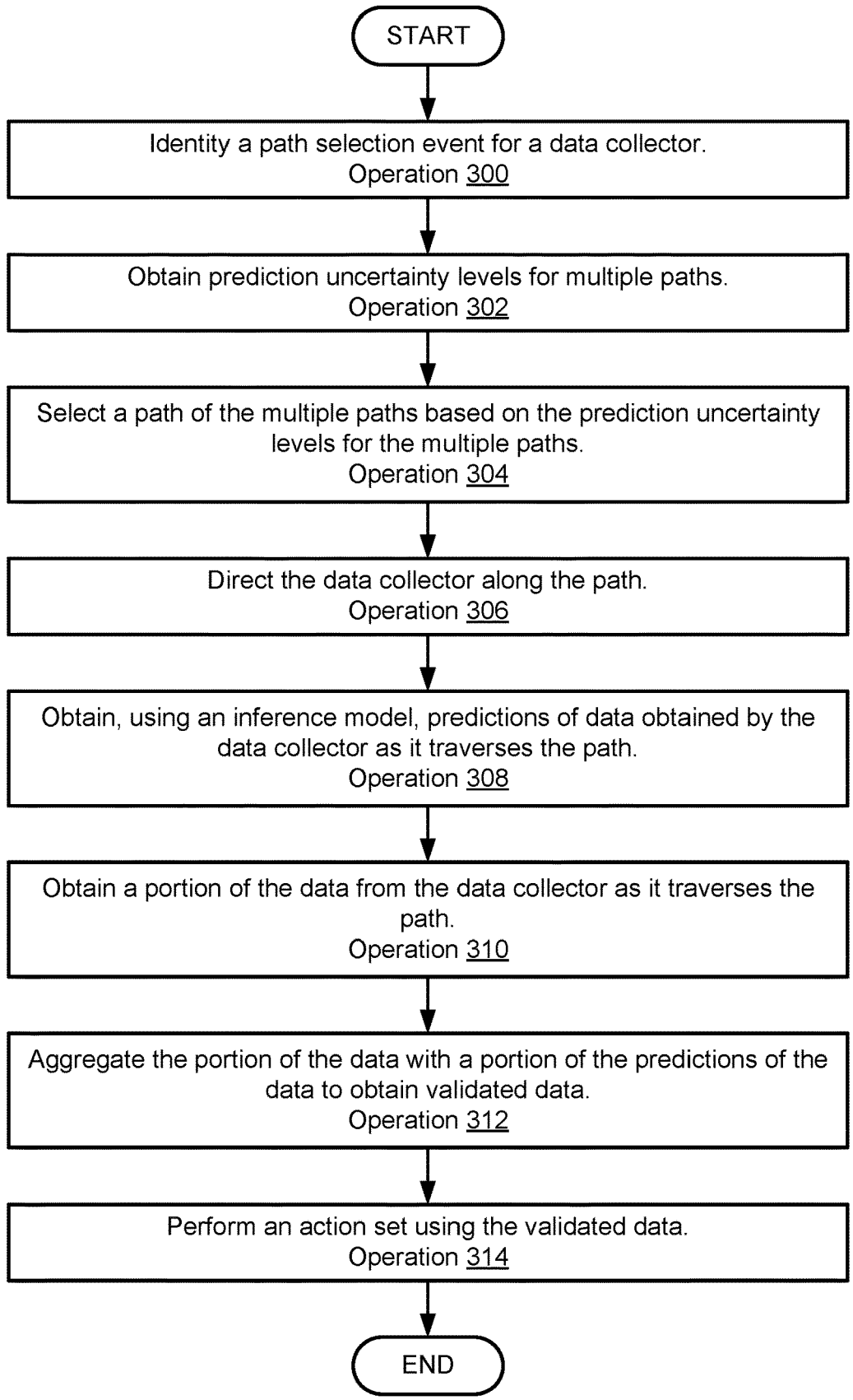
FIG. 3A shows a flow diagram illustrating a method of aggregating data in a distributed system in accordance with an embodiment.
Figure 3B:
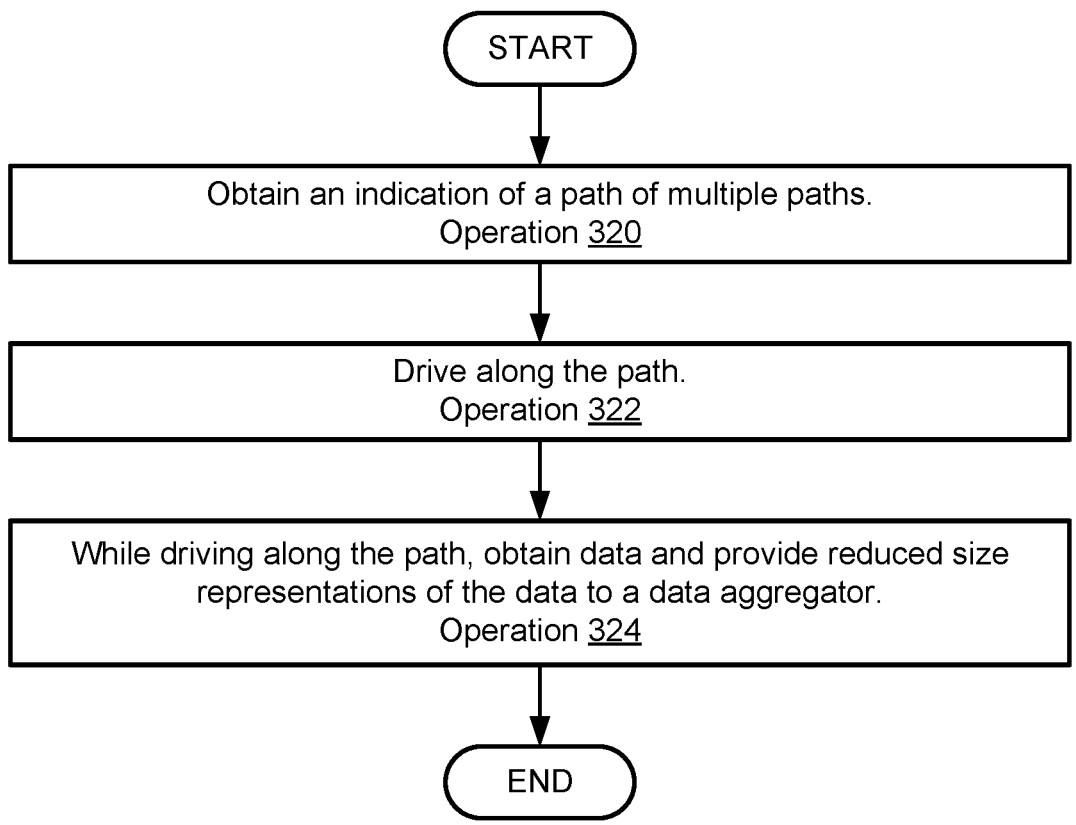
FIG. 3B shows a flow diagram illustrating a method of collecting data in accordance with an embodiment.

As discussed above, the components of FIG. 1 may perform various methods to aggregate data from a distributed system. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of aggregating data in a distributed system in accordance with an embodiment is shown. The method may be performed by a data aggregator and/or data collector.

At operation 300, a path select event for a data collector is identified. The path selection even may be any type of event for which a path for a data collector may need to be identified. For example, the path selection event may be receipt of a request for a path, a point in time occurring when a path for a data collector is to be identified, and/or other types of events.

AT operation 302, prediction uncertainty levels for multiple paths may be obtained. The prediction uncertainty levels for each of the multiple paths may be obtained, for a given path by (i) generating predictions and/or prediction uncertainties for points along the path, (ii) modifying the prediction uncertainties for the points along the time if any of the points are close to points along paths that other data collectors will follow, and (iii) using the modified prediction uncertainties to obtain the prediction uncertainty level for the path.

In an embodiment, the prediction uncertainty level is obtained by averaging the modified prediction uncertainties for the points of the path. The average may be a weighted average based on the lengths of each section of the path associated with the respective point (e.g., the path may be discretized into sections with a point being associated with each section).

At operation 304, a path of the multiple paths is selected based (e.g., at least in part) on the prediction uncertainty levels for the multiple paths. The path may be selected by calculating a score for each of the multiple paths. The score may be calculated using an objective function that take the prediction uncertainty level for a path into account when generating a score for the path. The scores for the paths may be used to rank the multiple paths, and the best ranked path may be used as the selected path.

As noted above, the objective function may dynamically change over time. Consequently, different objective functions may be used when different path selection events are encountered over time. Similarly, the objective function may take other factors into consideration such as the level of interest in each path, costs for traversing the respective paths, etc.

The multiple paths may be known to the data aggregator and/or the data collector. For example, the data collector may operate within an environment in which the potential paths are known. The multiple paths may now be known but may be discovered over time (e.g., in a scenario in which the data collector include an autonomous vehicle).

At operation 306, the data collector is directed along the path. The data collector may be directed along the path by (i) sending explicit instructions to the data collector regarding the path, (ii) not sending any instructions and for which a default or known preference (for paths selected in the absence of instructions) of the data collector may cause the data collector to traverse along the selected path, and/or (iii) via other methods.

Depending on the type of objective function and/or selection process utilized in operation 304, the path may cause the data collector to collect data from areas for which inaccurate predictions of the collected data are likely to be made, or to collect data from areas for which accurate predictions of the collected data are likely to be made.

At operation 308, predictions of data obtained by the data collector are obtained while the data collector traverses the path. The predictions may be obtained using the trained inference model, discussed above.

At operation 310, a portion of the data from the data collector is obtained as it traverses the path. The portion of the data may be obtained by receiving it from the data collector. The data collector may identify the portion of the data based on thresholds, and may send the data or reduced size representations of the data to the data aggregator.

At operation 312, the portion of the data is aggregated with a portion of the predictions of the data to obtain validated data. The validated data may be aggregated data 202, discussed with respect to FIG. 1A. The portion of the predictions of the data may be the predictions of operation 308 for which corresponding data is not provided by the data collector.

At operation 314, an action set is performed using the validated data. The action set may include one or more of (i) training/retraining inference models using the validated data, (ii) modifying the operation of the system of FIG. 1 and/or the operation of other components not shown in FIG. 1 based on the validated data, and/or (iii) any other number and/or types of actions.

The method may end following operation 314.

Using the method illustrated in FIG. 3A, embodiments disclosed herein may facilitate improvement in the accuracy of information known regarding an environment. The improvement in the accuracy of the information regarding the environment may facilitate improvement in inference models that may be more likely to generate accurate predictions. By improving the accuracy of predictions, less data may need to be transmitted from data collectors to a data aggregator, for the data aggregator to obtain an accurate collection of validated data. Additionally, during periods of time where communication bandwidth may be limited, data collectors may be directed to preferentially move to locations where higher inference models are able to provide more accurate predictions thereby reducing bandwidth usage (e.g., for communicating measurements) dynamically to match that available for communications.

Turning to FIG. 3B, a flow diagram illustrating a method of obtaining data in a distributed system in accordance with an embodiment is shown. The method may be performed by a data aggregator and/or data collector.

At operation 320, an indication of a path of multiple paths is obtained. The indication may be received by a data collector and from a data aggregator. The data collector may be capable of traversing any of the multiple paths.

At operation 322, the data collector is driven along the path. The data collector may drive along the path by providing the indication to a motion control system which may include self-driving functionality. The motion control system may drive the data collector along the path.

At operation 324, while driving along the path, data is obtained. The data may be obtained by taking measurements with one or more sensors. Reduced size representations of the data may be provided to the data aggregator. As noted above, the reduced size representations may include, for example, statistics, difference, copies of the data, and/or no data (e.g., when thresholds indicate that the data does not need to be provided). Any of the representations may be provided via a communication system to the data aggregator. To facilitate communications, the reduced size representations may be obtained by compressing the data, encapsulating the reduced size representations (e.g., to packetize it by adding control information to the payload), and sending the encapsulated reduced size representations of the data.

The method may end following operation 324.

Using the method illustrated in FIG. 3B, paths for data collectors to traverse may be selected in a manner that allows for more useful data regarding an environment to be obtained and/or the quantity of data that the data collector will provide to the data aggregator may be adapted to meet communication limitations (e.g., due to limited communication bandwidth).

Figure 4A:
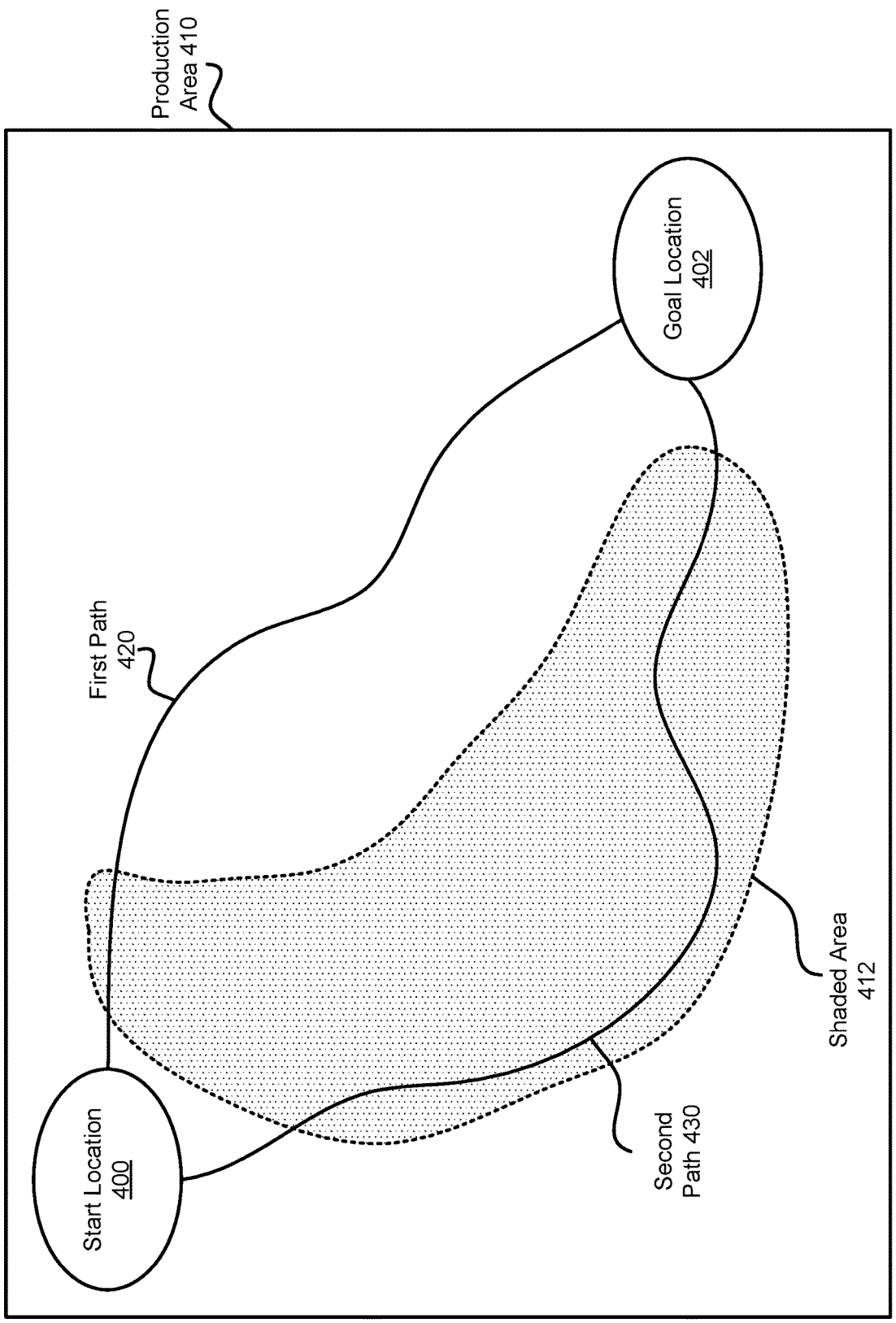
FIGS. 4A-4C show diagrams illustrating path selection over time in accordance with an embodiment over time.

Turning to FIGS. 4A-5D, diagrams illustrating path selection processes for an environment in accordance with an embodiment are shown. FIGS. 4A-4C may show examples of processes for selecting paths where no other data collectors are present, and FIGS. 5A-5D may show examples of processes for selecting paths where other data collectors may be present.

Turning to FIG. 4A, consider a scenario in which a data collector (not shown) is tasked with moving between start location 400 and goal location 402 in a production environment 410. The data collector may be tasked with, while moving, collecting temperature measurements. The temperature measurements may be usable to drive downstream control processes that may depend on the temperature measurements.

Within production area 410, a portion a shaded area 412 which is shielded from the sun while the area outside of the shaded are 412 is exposed to the sun. Consequently, the area exposed to the sun may varying in temperature to a much larger degree than shaded area 412, and much less regularly in variation (e.g., cloudy weather may significantly impact the temperatures in the are exposed to the sun).

To reduce data communications from the data collector, the data aggregator and data collector may host a twin inference model. However, due to the variability of the temperatures in the area exposed to the sun, the predictions of the temperatures for measurements in this area are would be collected by the data collector have a higher associated uncertainty.

As seen in FIG. 4A, a first path 420 between start location 400 and goal location 402 is generally outside of shaded area 412 (indicated by the are with dotted in fill), while a second path 420 between start location 400 and goal location 402 is generally inside of shaded area 412.

Figure 4B:
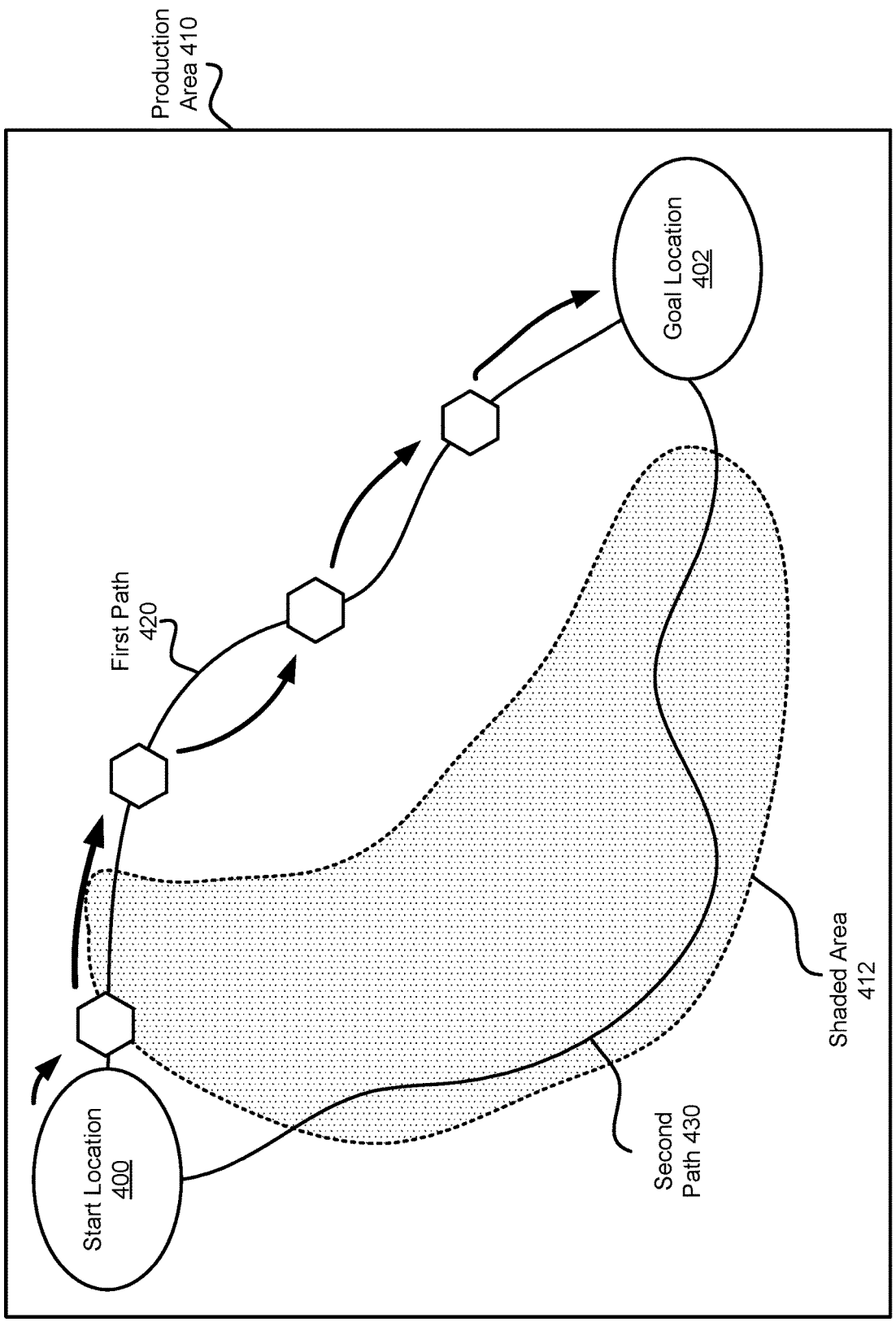

Turning to FIG. 4B, to decide which of these paths to use, the aggregator performs an uncertainty level evaluation for the first path. To do so, the data aggregator may obtain inferences for various locations along first path 420. For example, inferences for four locations along first path as indicated by the hexagonal blocks positioned on first path 420 may be evaluated. As seen in FIG. 4B, three of these four locations are in the unshaded area which is associated with high prediction uncertainty. Consequently, the calculated prediction uncertainty level for first path 420 is high.

Figure 4C:
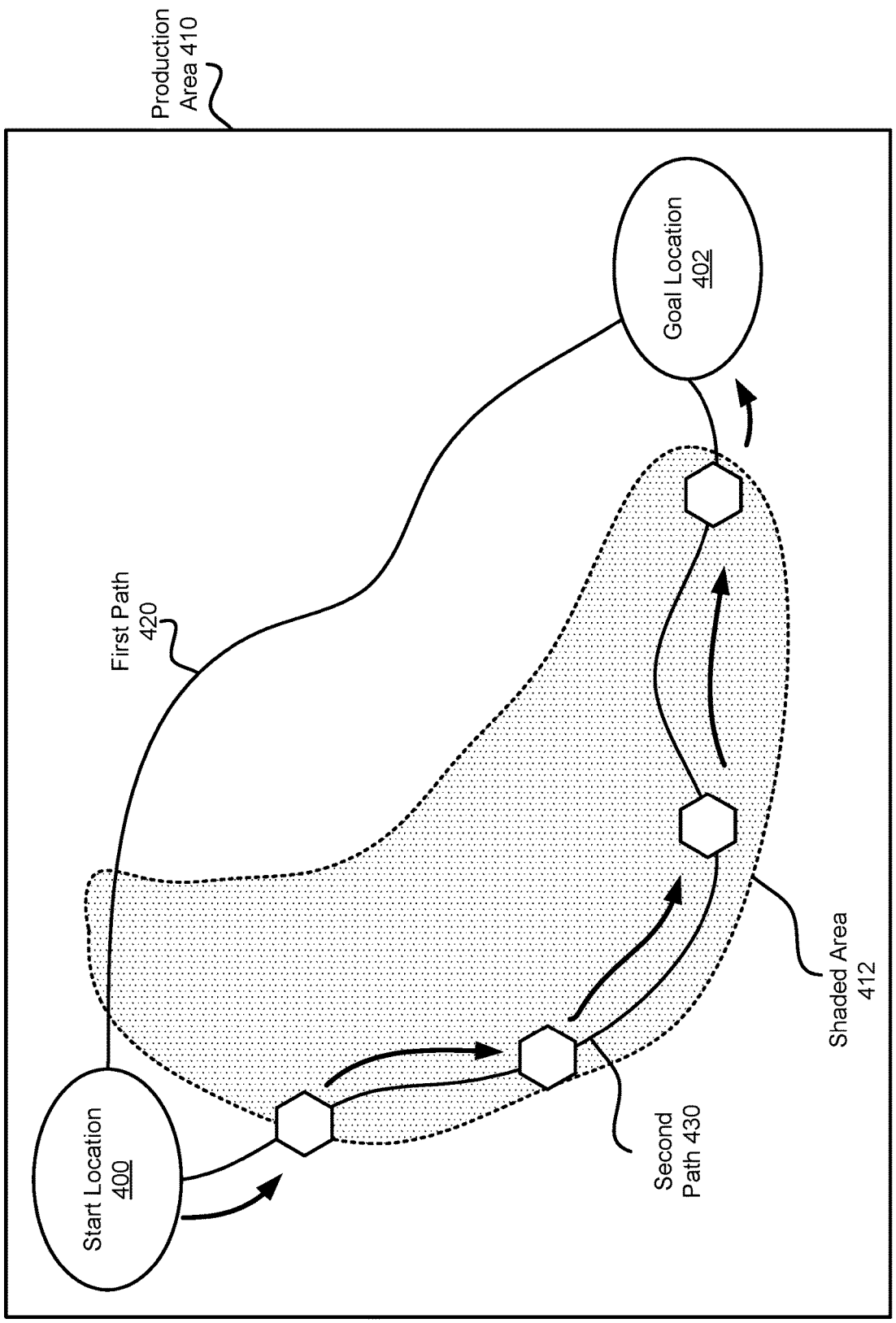

Turning to FIG. 4C, the aggregator also performs an uncertainty level evaluation for the second path 430. To do so, the data aggregator may obtain inferences for various locations along first path 430. For example, inferences for four locations along second path 430 as indicated by the hexagonal blocks positioned on second path 420 may be evaluated. As seen in FIG. 4C, all four locations are in shaded area 412 which is associated with low prediction uncertainty because the temperatures in these areas are not as dependent on weather conditions and/or other conditions. Consequently, the calculated prediction uncertainty level for second path 430 is high.

Based on these uncertainty levels, the data aggregator may direct the data collector down first path 420 to collect more data for which fewer accurate predictions are likely to be available (e.g., as indicated by the high prediction uncertainty for the inferences along first path 420).

Alternatively, if the communication network between the data aggregator and the data collector was under heavy load, then data aggregator may have used an objective function that heavily weights low prediction uncertainty as being superior to high prediction uncertainty. In such a scenario, the data aggregator may have directed the data collector down second path 430 to collect more data for which more accurate predictions are likely to be available thereby reducing the likelihood of the data collector sending data to the data aggregator while still collecting some data that may be relevant. By doing so, the data collector behavior may be tailored to that which may be supported by the distributed system.

Figure 5A:
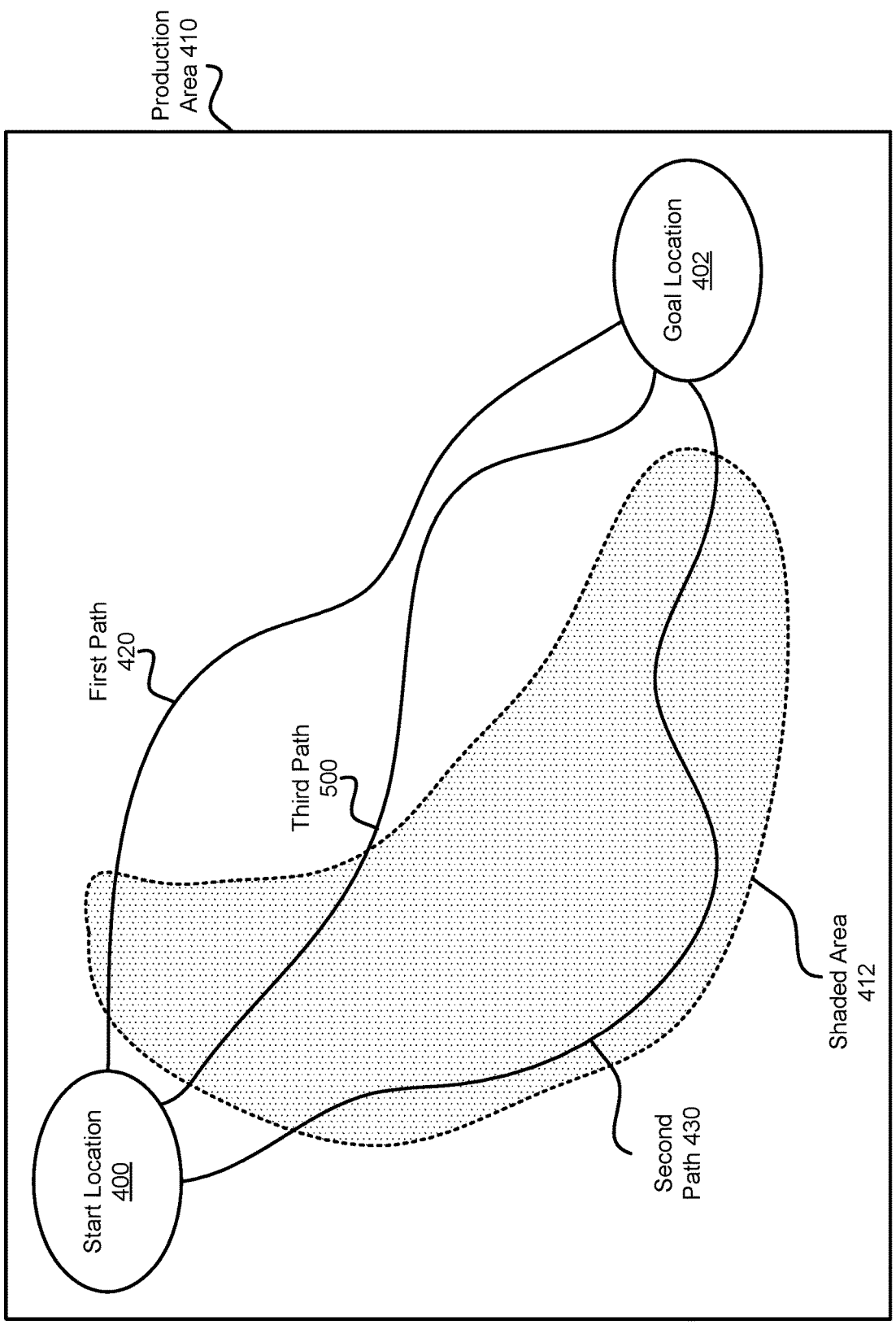
FIGS. 5A-5D show diagrams illustrating multiple path selections over time in accordance with an embodiment over time.
Figure 5B:
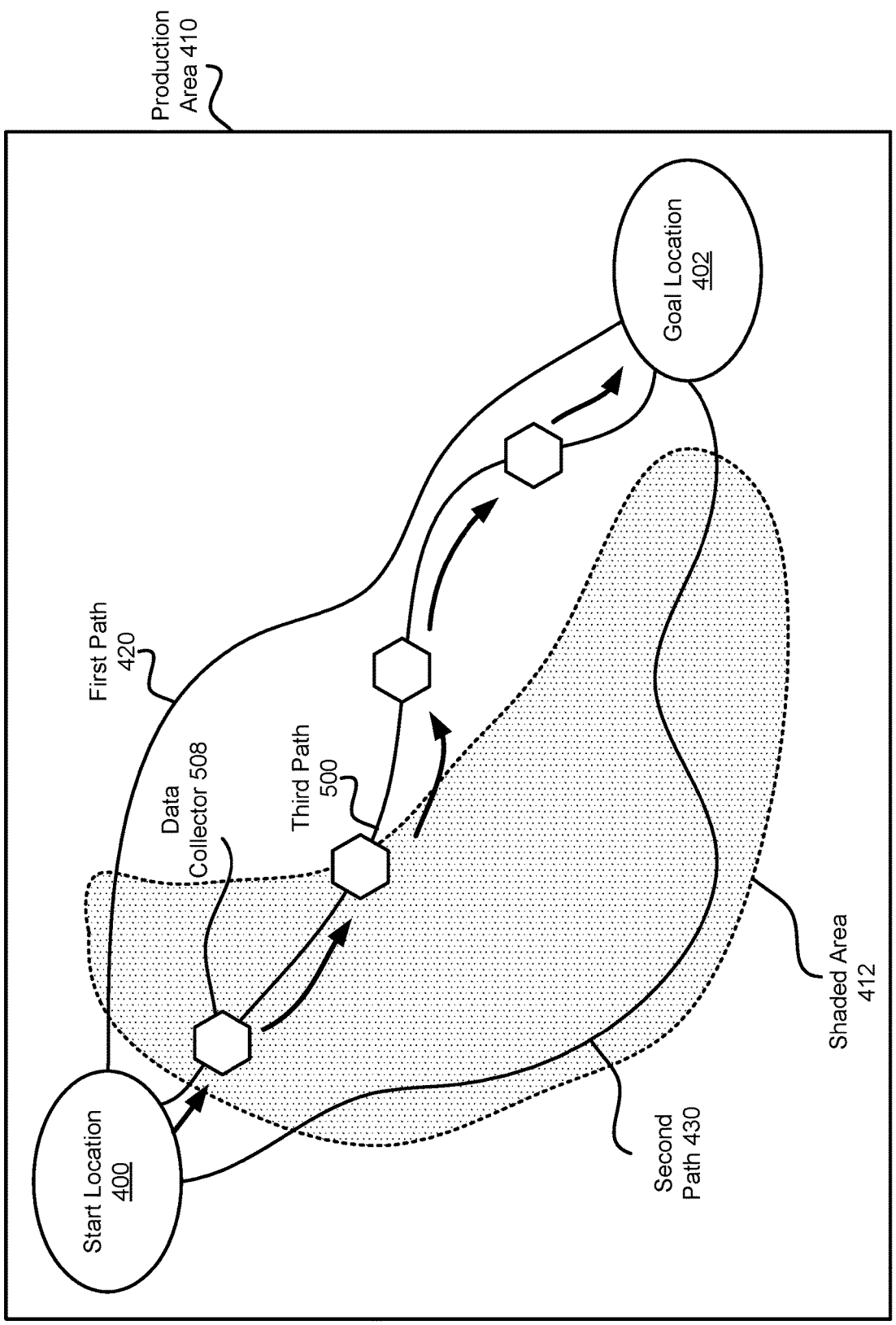

Turning to FIG. 5A, now consider a second scenario, similar to that as shown in FIG. 4A, except that (i) an additional third path 500 is present, and (ii) two data collectors each need to be instructed on how to move between start location 400 and goal location 402 are present. The data aggregator may, as described with respect to FIGS. 4B-4C calculate prediction uncertainty levels for first path 420 and second path 430. Turning to FIG. 5B, the data aggregator may also calculate a prediction uncertainty level for third path 500.

A seen in FIG. 5B, the prediction uncertainty for points along third path 500 may include some impacted by shaded area 412 and others that are not impacted by shaded area 412. Accordingly, the predicted uncertainty level for third path 500 may be moderate.

Figure 5C:
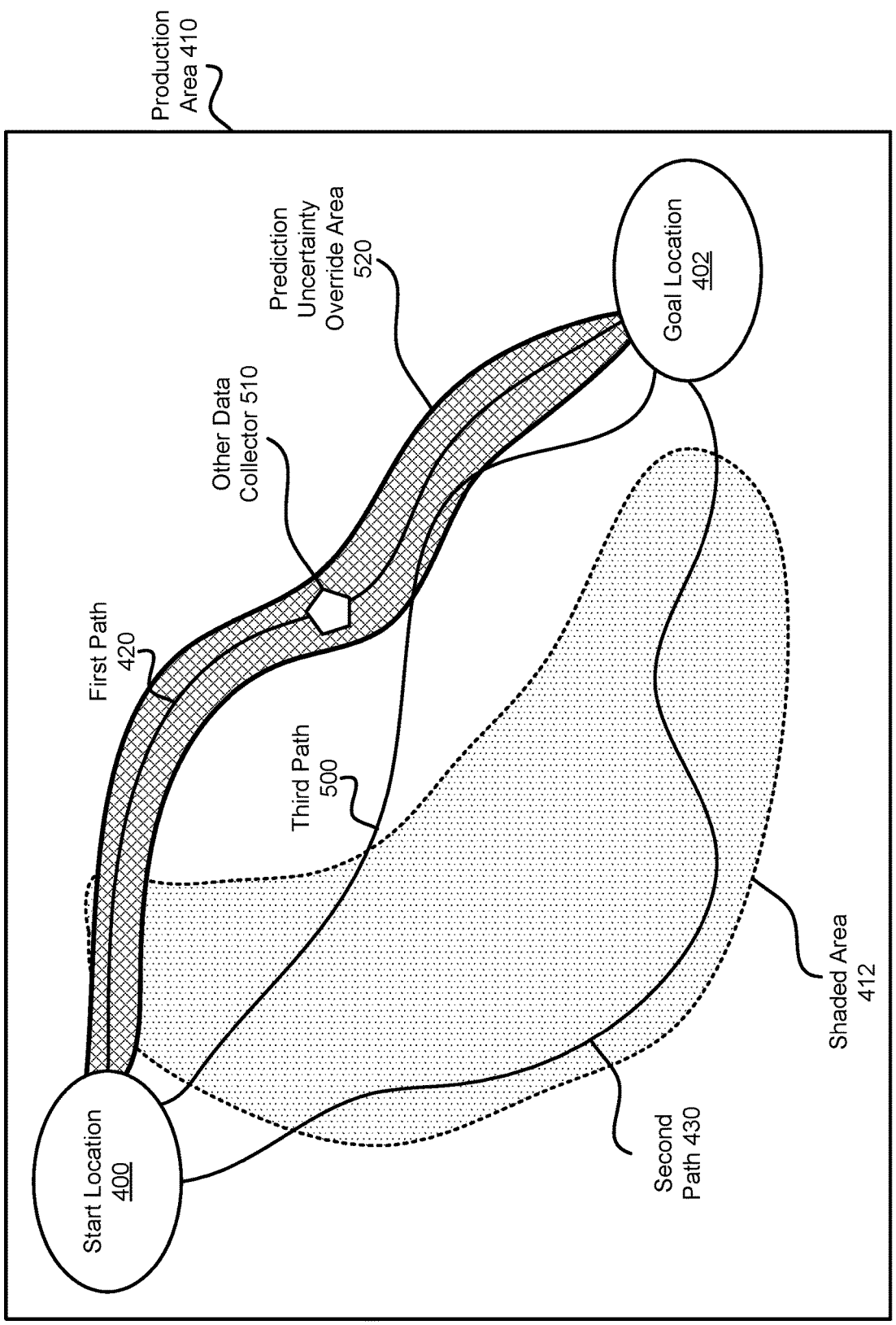

Turning to FIG. 5C, based on these prediction uncertainties, data aggregator instructs another data collector 510 to traverse first path 420. Once assigned, the data aggregator may assign a prediction uncertainty override area 520 (shown with cross-hatch fill) to the area near first path 420. The prediction uncertainty override area 520 may be an area where prediction uncertainty is treated as being very low because the other data collector 510 will traverse through it, thereby enabling data from the area to be obtained by the data aggregator.

As seen in FIG. 5C, a portion of third path 500 traverses through prediction uncertainty override area 520. Consequently, the data aggregator recalculates the prediction uncertainty level for third path 500. In this case, by treating the portion of third path 500 that traverses through prediction uncertainty override area 520 as being of very low uncertainty, the prediction uncertainty level for third path 500 is reduced to less than the prediction uncertainty level for second path 430 due to the weighting of the prediction uncertainties of locations along the paths.

Figure 5D:
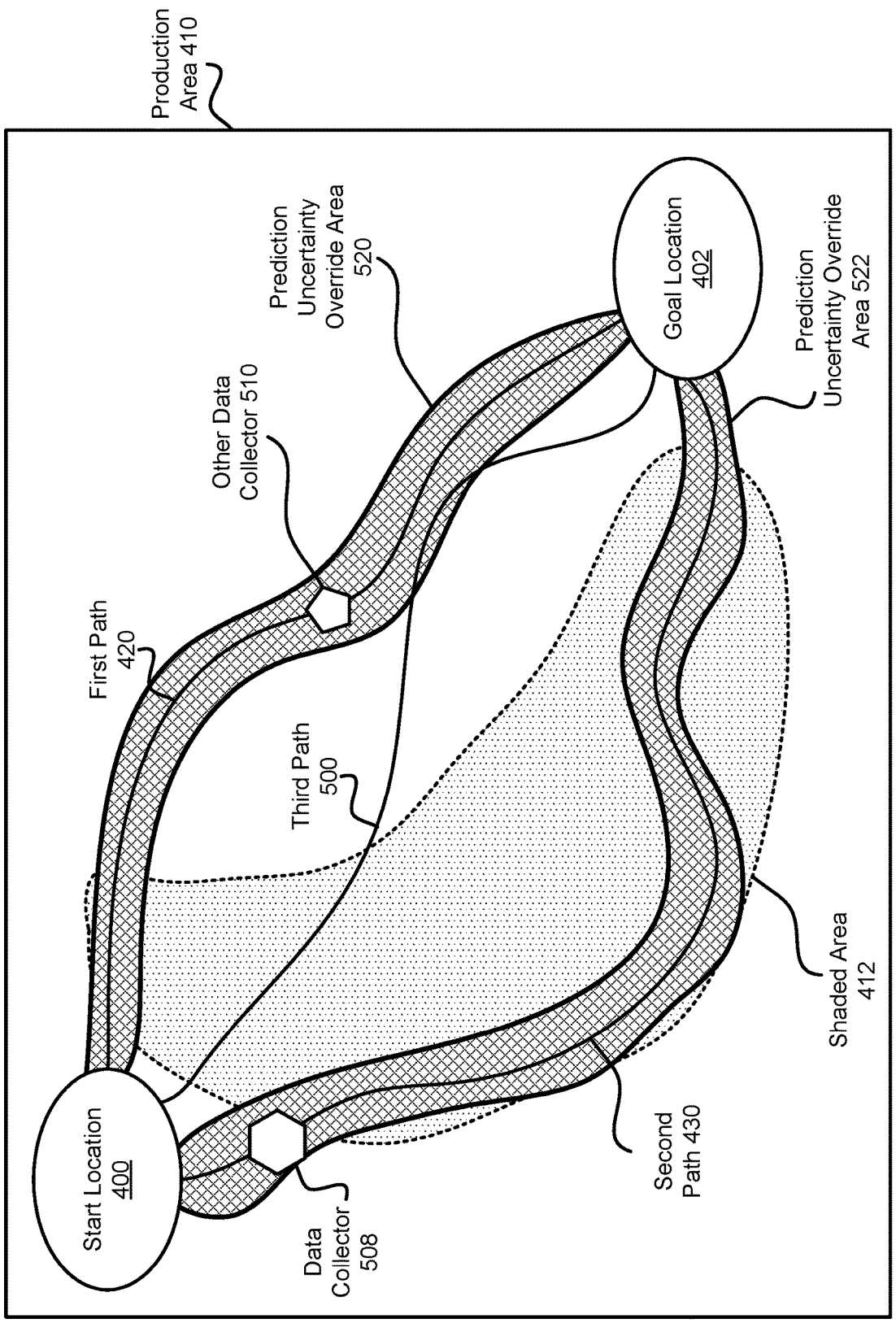

Turning to FIG. 5D, based on the updated prediction uncertainties and the prediction uncertainty levels for second path 430 and third path 500, data collector 508 is directed down second path 430. Based on this direction, a second prediction uncertainty override area 522 is established. In this case, the prediction uncertainty override area 522 does not impact the prediction uncertainty levels of other paths. However, the uncertainty override area 522 could have impacted other paths if any traversed through prediction uncertainty override area 522.

Thus, as illustrated in FIGS. 4A-5D, embodiments disclosed herein may provide for dynamic path selection in a distributed system that may enable environments to be more fully characterized while also managing limited communication bandwidth, power availability, and/or other factors.

Figure 6:
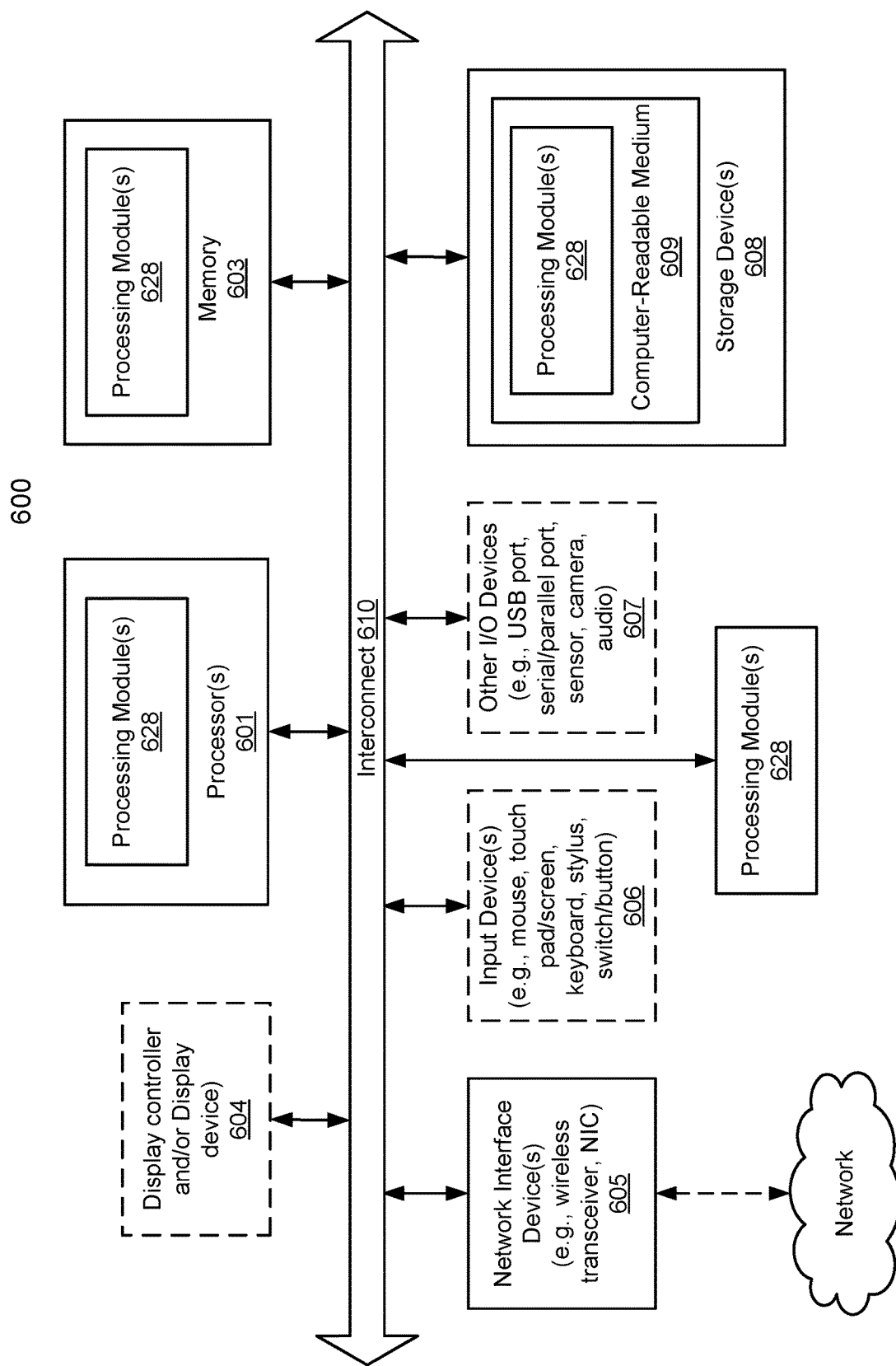
FIG. 6 shows a block diagram illustrating a data processing system in accordance with an embodiment.

Any of the components illustrated in FIGS. 1-5D may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-607 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection in a distributed system where data is collected in a data aggregator of the distributed system and from a data collector of the distributed system that is operably connected to the data aggregator via a communication system, the method comprising:
    identifying, by the data aggregator, a path selection event for the data collector;
    obtaining, by the data aggregator and in response to the path selection event, prediction uncertainty levels for multiple paths available to the data collector;
    selecting, by the data aggregator, a path of the multiple paths based on the prediction uncertainty levels for the multiple paths;
    directing, by the data aggregator, the data collector along the path;
    obtaining, by the data aggregator and using an inference model, predictions of data obtained by the data as the data collector traverses the path;
    obtaining, by the data aggregator, a portion of the data from the data collector as it traverses the path;
    aggregating, by the data aggregator, the portion of the data and a portion of the predictions to obtain validated data; and
    initiating, by the data aggregator and based on the validated data, performance of one or more actions to manage operation of the distributed system.

2. The method of claim 1, wherein obtaining the portion of the data comprises:
    obtaining, by the data aggregator and from the data collector, a reduced size representation of a sub-portion of the portion of the data; and
    reconstructing, by the data aggregator, the sub-portion of the portion of the data using the reduced size representation and a prediction of the predictions corresponding to the sub-portion of the portion of the data.

3. The method of claim 2, wherein the reduced size representation comprises a difference between a collector prediction that is identical to the prediction and the sub-portion of the portion of the data.

4. The method of claim 2, wherein the reduced size representation comprises a statistic derived from a plurality of the sub-portion of the portion of the data obtained by the data collector.

5. The method of claim 1, wherein obtaining the prediction uncertainty levels for the multiple paths comprises:
    for the path of the multiple paths:
        obtaining prediction uncertainties from the inference model for points along the path; and
        using, at least in part, the prediction uncertainties associated with the points to obtain a prediction uncertainty level of the prediction uncertainty levels for the path.

6. The method of claim 5, wherein selecting the path comprises:
    making a determination that the prediction uncertainty level is a highest prediction uncertainty level of the prediction uncertainty levels; and
    selecting the path of the multiple paths based on the determination.

7. The method of claim 6, wherein each of the multiple paths is a possible path between a start location and a goal location for the data collector, and a duration of time for traversing each of the multiple paths is substantially similar.

8. The method of claim 5, wherein selecting the path comprises:
making a determination that the prediction uncertainty level is a lowest prediction uncertainty level of the prediction uncertainty levels; and
selecting the path of the multiple paths based on the determination.

9. The method of claim 5, wherein the prediction uncertainties for the points are used in a weighted average to obtain the prediction uncertainty level.

10. The method of claim 1, wherein a path of the multiple paths is selected additionally based on a sensitivity level of a consumer of the validated data.

11. A non-transitory machine-readable medium having instructions stored therein, which when executed by a processor, cause the processor to perform operations for managing data collection in a distributed system where data is collected in a data aggregator of the distributed system and from a data collector of the distributed system that is operably connected to the data aggregator via a communication system, the operations comprising:
identifying, by the data aggregator, a path selection event for the data collector;
obtaining, by the data aggregator and in response to the path selection event, prediction uncertainty levels for multiple paths available to the data collector;
selecting, by the data aggregator, a path of the multiple paths based on the prediction uncertainty levels for the multiple paths;
directing, by the data aggregator, the data collector along the path;
obtaining, by the data aggregator and using an inference model, predictions of data obtained by the data as the data collector traverses the path;
obtaining, by the data aggregator, a portion of the data from the data collector as it traverses the path;
aggregating, by the data aggregator, the portion of the data and a portion of the predictions to obtain validated data; and
initiating, by the data aggregator and based on the validated data, performance of one or more actions to manage operation of the distributed system.

12. The non-transitory machine-readable medium of claim 11, wherein obtaining the portion of the data comprises:
obtaining, by the data aggregator and from the data collector, a reduced size representation of a sub-portion of the portion of the data; and
reconstructing, by the data aggregator, the sub-portion of the portion of the data using the reduced size representation and a prediction of the predictions corresponding to the sub-portion of the portion of the data.

13. The non-transitory machine-readable medium of claim 12, wherein the reduced size representation comprises a difference between a collector prediction that is identical to the prediction and the sub-portion of the portion of the data.

14. The non-transitory machine-readable medium of claim 12, wherein the reduced size representation comprises a statistic derived from a plurality of the sub-portion of the portion of the data obtained by the data collector.

15. The non-transitory machine-readable medium of claim 11, wherein obtaining the prediction uncertainty levels for the multiple paths comprises:
for the path of the multiple paths:
obtaining prediction uncertainties from the inference model for points along the path; and
using, at least in part, the prediction uncertainties associated with the points to obtain a prediction uncertainty level of the prediction uncertainty levels for the path.

16. A data aggregator, comprising:
a processor; and
a memory coupled to the processor to store instructions, which when executed by the processor, cause the processor to perform operations for managing data collection in a distributed system where data is collected in a data aggregator of the distributed system and from a data collector of the distributed system that is operably connected to the data aggregator via a communication system, the operations comprising:
identifying a path selection event for the data collector;
obtaining, in response to the path selection event, prediction uncertainty levels for multiple paths available to the data collector;
selecting a path of the multiple paths based on the prediction uncertainty levels for the multiple paths;
directing the data collector along the path;
obtaining, using an inference model, predictions of data obtained by the data as the data collector traverses the path;
obtaining a portion of the data from the data collector as it traverses the path;
aggregating the portion of the data and a portion of the predictions to obtain validated data; and
initiating, based on the validated data, performance of one or more actions to manage operation of the distributed system.

17. The data aggregator of claim 16, wherein obtaining the portion of the data comprises:
obtaining, by the data aggregator and from the data collector, a reduced size representation of a sub-portion of the portion of the data; and
reconstructing, by the data aggregator, the sub-portion of the portion of the data using the reduced size representation and a prediction of the predictions corresponding to the sub-portion of the portion of the data.

18. The data aggregator of claim 17, wherein the reduced size representation comprises a difference between a collector prediction that is identical to the prediction and the sub-portion of the portion of the data.

19. The data aggregator of claim 17, wherein the reduced size representation comprises a statistic derived from a plurality of the sub-portion of the portion of the data obtained by the data collector.

20. The data aggregator of claim 16, wherein obtaining the prediction uncertainty levels for the multiple paths comprises:
for the path of the multiple paths:
obtaining prediction uncertainties from the inference model for points along the path; and
using, at least in part, the prediction uncertainties associated with the points to obtain a prediction uncertainty level of the prediction uncertainty levels for the path.

* * * * *